United States Patent
Bauer et al.

(10) Patent No.: US 8,907,662 B2
(45) Date of Patent: Dec. 9, 2014

(54) SYSTEM, AIRCRAFT OR SPACECRAFT, AND METHOD FOR MEASURING A CURRENT POSITION OF A SECOND VEHICLE PART RELATIVE TO A FIRST VEHICLE PART

(75) Inventors: Hans-Achim Bauer, Hamburg (DE); Andre Zybala, Hanstedt (DE)

(73) Assignee: Airbus Operations GmbH, Hamburg (DE)

( * ) Notice: Subject to any disclaimer, the term of this patent is extended or adjusted under 35 U.S.C. 154(b) by 271 days.

(21) Appl. No.: 13/516,324

(22) PCT Filed: Dec. 8, 2010

(86) PCT No.: PCT/EP2010/069124
§ 371 (c)(1),
(2), (4) Date: Aug. 20, 2012

(87) PCT Pub. No.: WO2011/073063
PCT Pub. Date: Jun. 23, 2011

(65) Prior Publication Data
US 2013/0176019 A1 Jul. 11, 2013

Related U.S. Application Data

(60) Provisional application No. 61/286,496, filed on Dec. 15, 2009.

(30) Foreign Application Priority Data

Dec. 15, 2009 (DE) .......................... 10 2009 054 700

(51) Int. Cl.
*G01B 7/14* (2006.01)
*G01D 5/20* (2006.01)
*B64D 11/00* (2006.01)
*B64D 11/06* (2006.01)

(52) U.S. Cl.
CPC .......... *G01B 7/14* (2013.01); *B64D 2011/0637* (2013.01); *G01D 5/2086* (2013.01); *G01D 5/2093* (2013.01); *G01D 5/208* (2013.01); *G01D 5/2073* (2013.01); *B64D 11/06* (2013.01); *B64D 11/0015* (2013.01); *B64D 2011/0617* (2013.01)
USPC .................................................... 324/207.17

(58) Field of Classification Search
CPC ...... G01D 5/2086; G01B 7/14; G01B 11/002; G01B 21/00; G01B 21/04; B64D 11/0015; B64D 2011/0617; B64D 2011/0637; B64D 31/02
See application file for complete search history.

(56) References Cited

U.S. PATENT DOCUMENTS

| 6,130,608 A * | 10/2000 | McKeown et al. ............ 340/438 |
| 6,400,259 B1 | 6/2002 | Bourcart et al. |
| 7,560,827 B2 * | 7/2009 | Jacas-Miret et al. .......... 307/9.1 |
| 2009/0295223 A1 | 12/2009 | Bauer et al. |

FOREIGN PATENT DOCUMENTS

| DE | 19545220 | 8/1997 |
| DE | 19743313 | 12/1998 |
| DE | 10149331 | 4/2003 |
| WO | 9916637 | 4/1999 |
| WO | 2004052689 | 6/2004 |

OTHER PUBLICATIONS

Translation of International Search Report, International Application No. PCT/EP20101069124, mailed Jan. 28, 2011.
German Office Action, Dec. 15, 2009.

* cited by examiner

*Primary Examiner* — Tung X Nguyen
(74) *Attorney, Agent, or Firm* — Greer, Burns & Crain Ltd.

(57) ABSTRACT

An arrangement for transmitting data and/or power between a chassis and a seat that is movably disposed on said chassis by means of a guide rail. Several primary iron half-cores that support at least one primary winding are arranged in a fixed manner within the guide rail while at least one secondary iron half-core comprising at least one secondary winding is placed on the seat. The primary half-cores are disposed within the guide rail in such a way that at least one primary and one secondary iron half-core are positioned relative to each other so as to transmit data and/or power.

7 Claims, 3 Drawing Sheets

SYSTEM, AIRCRAFT OR SPACECRAFT, AND METHOD FOR MEASURING A CURRENT POSITION OF A SECOND VEHICLE PART RELATIVE TO A FIRST VEHICLE PART

CROSS-REFERENCE TO RELATED APPLICATIONS

This application claims the benefit of U.S. Provisional Application No. 61/286,496, filed Dec. 15, 2009 and German Patent Application No. 10 2009 054 700.2, filed Dec. 125, 2009, the entire disclosures of which are herein incorporated by reference.

FIELD OF THE INVENTION

The present invention relates to a system, to an aircraft or spacecraft, and to a method for measuring a current position of a second vehicle part relative to a first vehicle part.

Although they can be applied to any vehicles, the present invention and the problem on which it is based will be described in greater detail in relation to seats for passengers in an aircraft.

According to a solution known internally to the applicant, seats for passengers are mounted on a rail system in the cabin of an aircraft. The rails of the rail system usually comprise a 2.54 cm grid in the longitudinal direction of the cabin, which grid can be brought into engagement with locking means of the seats so as to lock the seats in different positions along the rails. It is necessary to be able to position the seats in this flexible manner in order to be able to meet different customer requirements.

However, a change in the position of the seats—for example as a result of a change in the number of rows of seats based on a customer's requirements—requires a change in the position of various means which are associated with a respective seat at the same time. Examples of means of this type include a seat number display, a reading lighting system and a pax call button.

At present, the position of the means which are associated with the seats is usually changed entirely manually, and this is time-consuming and expensive.

SUMMARY OF THE INVENTION

The object of the present invention is to overcome or at least reduce the above-mentioned drawbacks.

Accordingly, a system, in particular for an aircraft or spacecraft, comprising the following is provided: a first vehicle part, which comprises one or more primary windings; a second vehicle part, which comprises one or more secondary windings for a magnetic interaction with the one or more primary windings and can be arranged in various positions relative to the first vehicle part; an energy supply device, which is set up so as to charge the one or more primary windings with a voltage or current in a first mode of the system; a measuring means, which is set up so as to measure a resulting current flowing through the one or more primary windings or a resulting voltage at the one or more primary windings; and an evaluation means, which determines a current position of the second vehicle part relative to the first vehicle part as a function of the resulting current or voltage.

Furthermore, an aircraft or spacecraft comprising the system according to the invention is provided.

Furthermore, a method for measuring a current position of a second vehicle part relative to a first vehicle part, in particular for an aircraft or spacecraft, comprising the following steps is provided: arranging the second vehicle part, which comprises one or more secondary windings, adjacent to the first vehicle part, which comprises one or more primary windings, in such a way that at least one secondary winding magnetically interacts with at least one primary winding; charging the one or more primary windings with a voltage or current; measuring a resulting current flowing through the one or more primary windings or a resulting voltage at the one or more primary windings; and determining the current position of the second vehicle part relative to the first vehicle part as a function of the resulting current or voltage.

The idea behind the invention is to provide automatic measurement of the position of the second vehicle part relative to the first vehicle part. Thus, for example, in the aircraft described at the outset the position of a seat relative to the cabin floor or the rail system can be detected automatically. This makes it possible for example to display the seat number at the new current position of the seat automatically. For this purpose, a plurality of seat number displays in the form of LCD screens may for example be arranged along the cabin at small intervals. The seat number display closest to the new current position of the seat can then be switched to display the seat number of the seat.

The system according to the invention, the aircraft or spacecraft according to the invention and/or the method according to the invention further provide the basis for checking whether the current position of a seat also corresponds to the target position thereof, for example after assembling the seats mentioned at the outset on the rail system.

Accordingly, the system according to the invention, the aircraft or spacecraft according to the invention and/or the method according to the invention are suitable for reducing manual work and thus costs.

Advantageous developments of the invention are provided in the dependent claims.

In a preferred development of the system according to the invention, the second vehicle part comprises a load which in a second mode of the system is connected to the one or more secondary windings, the energy supply device or a further energy supply device being set up so as to supply energy to the one or more primary windings so as to supply the load with energy by means of the one or more primary secondary windings. Accordingly, the primary and secondary windings take on a dual function. On the one hand, they make it possible to measure the current position of the second vehicle part. On the other hand, they provide transmission of energy. Overall, this can lead to a saving on components.

In a further preferred development of the system according to the invention, the evaluation means supplies the current position of the second vehicle part to an energy management means, which is set up so as to control the energy supply device or the further energy supply device in such a way that it only supplies energy to one or more primary windings which overlap at least in part with the secondary winding or windings. Energy can only be transmitted efficiently in places where the primary and secondary windings overlap completely or in part. Supplying energy to primary windings which do not interact with any of the secondary windings would lead to unnecessary magnetic radiation, which is prevented by this development.

In a further preferred development of the system according to the invention, the second vehicle part comprises a data input and/or data output device, which in the second and/or a third mode of the system is connected to the one or more secondary windings. Preferably, the one or more primary windings are connected to a computer means, the computer means being set up so as to supply data to the data input and/or data output device by means of the one or more primary and secondary windings and/or to receive data from the data input and/or data output device by means of the one or more primary and secondary windings. The data transmission by means of the primary and secondary windings can thus be provided in addition or as an alternative to the above-mentioned transmission of energy. The primary and secondary windings thus take on a dual or triple function, and this can lead to a saving on components.

Naturally, the evaluation means can also supply the current position of the second vehicle part to a data management means, which is set up so as to control the computer means in such a way that it only supplies the data to one or more primary windings which overlap with the secondary winding or windings. In this way, reliable, energy-efficient data transmission can be provided.

In a further preferred development of the system according to the invention, the measuring means is set up so as to measure the resulting current or voltage individually at each of the plurality of primary windings. In this way, it can be established in a simple manner which of the primary windings is magnetically affected by one or more of the secondary windings.

In a further preferred development of the system according to the invention, the evaluation means is set up so as to determine, as a function of the resulting current or voltage, the extent to which a primary winding overlaps with a secondary winding. Preferably, the evaluation means takes this overlap into account in the determination of the current position of the second vehicle part. This makes the determination of the current position more precise.

In a further preferred development of the system according to the invention, the evaluation means supplies the current position of the second vehicle part to a comparison means. This comparison means preferably compares the current position with a target position, and outputs an error message if the current position is different from the target position. The error message can subsequently be used to correct the current position of the second vehicle part.

In a further preferred development of the aircraft or spacecraft according to the invention, the computer means is formed as a cabin management system and/or in-flight entertainment system of the aircraft or spacecraft. In the present context, a "cabin management system" should be understood to mean a system which controls virtually all of the devices in the cabin, for example an air-conditioning system, a cabin illumination system or the processing of pax calls. A cabin management system by the applicant is also known as a "CIDS" (cabin intercommunication data system). In-flight entertainment systems are used to supply entertainment programmes, for example films or computer games, to the passengers.

By connecting the cabin management system and/or the in-flight entertainment system according to this development to the data input and/or data output device of the second vehicle part, cabin-related functions, in particular pax calls, can be controlled by means of the data input and/or data output device, for example, or for example films can be displayed on said device.

In a further preferred development of the aircraft or spacecraft according to the invention, the evaluation means supplies the current position of the second vehicle part to a cabin management system of the aircraft or spacecraft. The cabin management system subsequently activates passenger-related devices which are associated with the current position. In the present context, "activation" preferably means that the device is switched on or off. For example, a seat number display in the region of the new current position of the seat is typically switched on. However, in the present context, "activation" preferably also means that the passenger can start to operate the device. For example, a reading lighting system at the old current position is permanently switched off, whilst a reading lighting system at the new current position is connected, in such a way that the passenger can switch it on and off.

In a further preferred development of the aircraft or spacecraft according to the invention, the passenger-related devices are formed as passenger service units. Preferably, for example, more passenger service units (PSUs) than seats are provided. For example, the cabin management system subsequently activates the passenger service units which are closest to the new current position of a respective seat. This makes it unnecessary to reposition passenger service units. In the present context, a "passenger service unit" should be understood to mean a module which performs a number of passenger-related functions, for example providing reading light and acoustic and/or visual information.

In a further preferred development of the aircraft or spacecraft according to the invention, the comparison means is a component of a cabin management system of the aircraft or spacecraft. For example, in this way an error message which is generated by the comparison means can be displayed in a simple manner by a display means, for example by means of a flight attendant data input and output device (flight attendant panel) which a cabin management system already has as standard.

In a further preferred development of the aircraft or spacecraft according to the invention, the first vehicle part is formed as a seat and the second vehicle part is formed as a seat rail or a cabin floor of the aircraft or spacecraft.

In a further preferred development of the method according to the invention, energy and/or data are transmitted to a load or a data input and/or data output device of the second vehicle part by means of the one or more primary and secondary windings.

BRIEF DESCRIPTION OF THE DRAWINGS

The invention is explained in greater detail in the following by way of embodiments, with reference to the appended figures of the drawings, in which.

DESCRIPTION OF EXEMPLARY EMBODIMENTS

Figure 1:
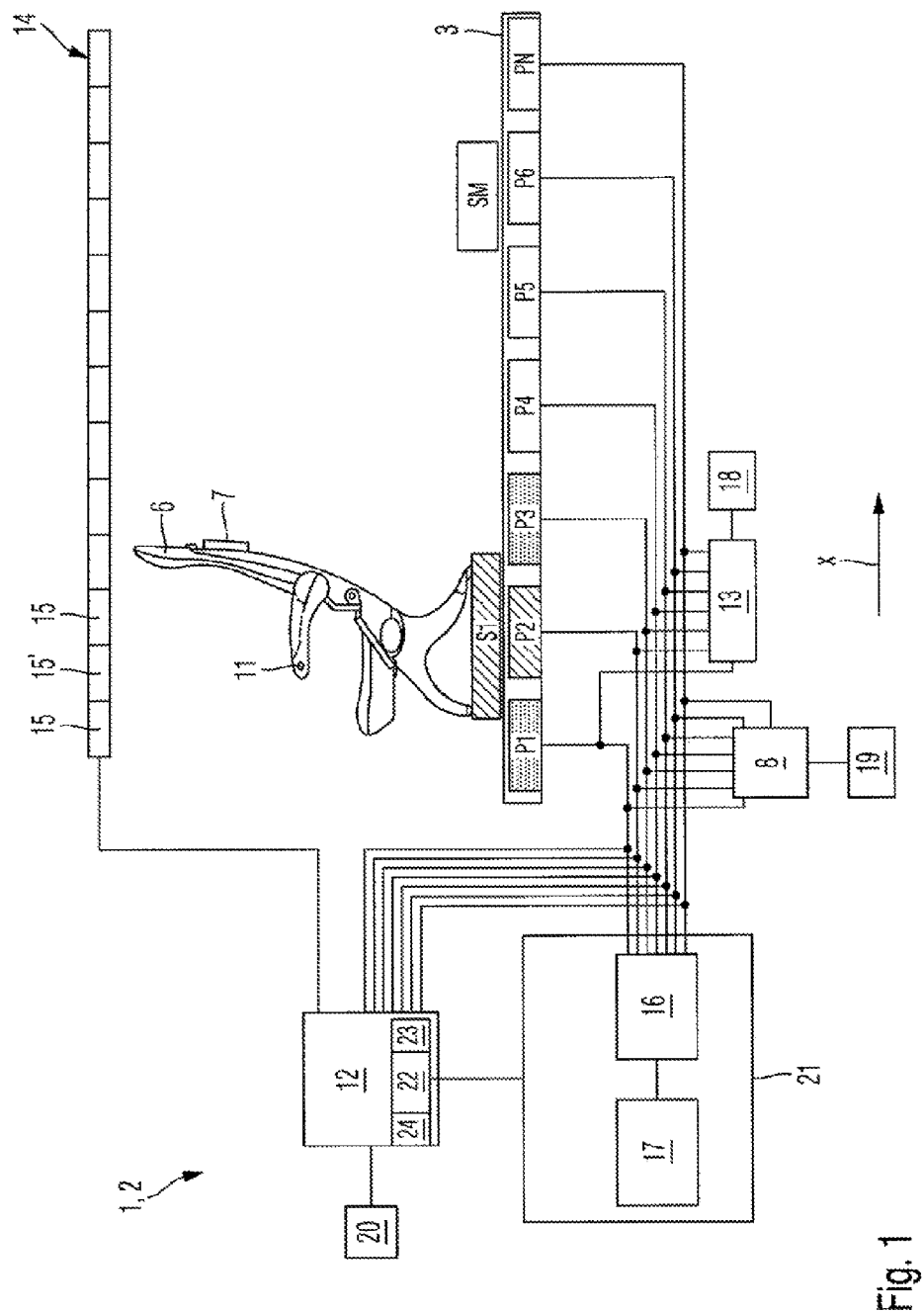
FIG. 1 shows schematically a system according to an embodiment of the present invention.

In the figures, like or functionally equivalent components are denoted by like reference numerals, unless stated otherwise.

In FIG. 1, electrical lines are shown as solid lines. Intersections of the electrical lines are shown as solid circles.

FIG. 1 shows a system 1 according to a preferred embodiment of the present invention. The system 1 is a component of an aircraft 2 (not shown in greater detail).

The system 1 comprises a rail system 3, which is arranged for example in the region of the cabin floor of the aircraft 2. The rail system 3 comprises a plurality of primary windings P1 to PN, which are arranged at regular intervals from one another along the longitudinal axis X of the aircraft 2. This is also shown in FIG. 2, which is a perspective view of the rail system 3 from FIG. 1.

Figure 2:
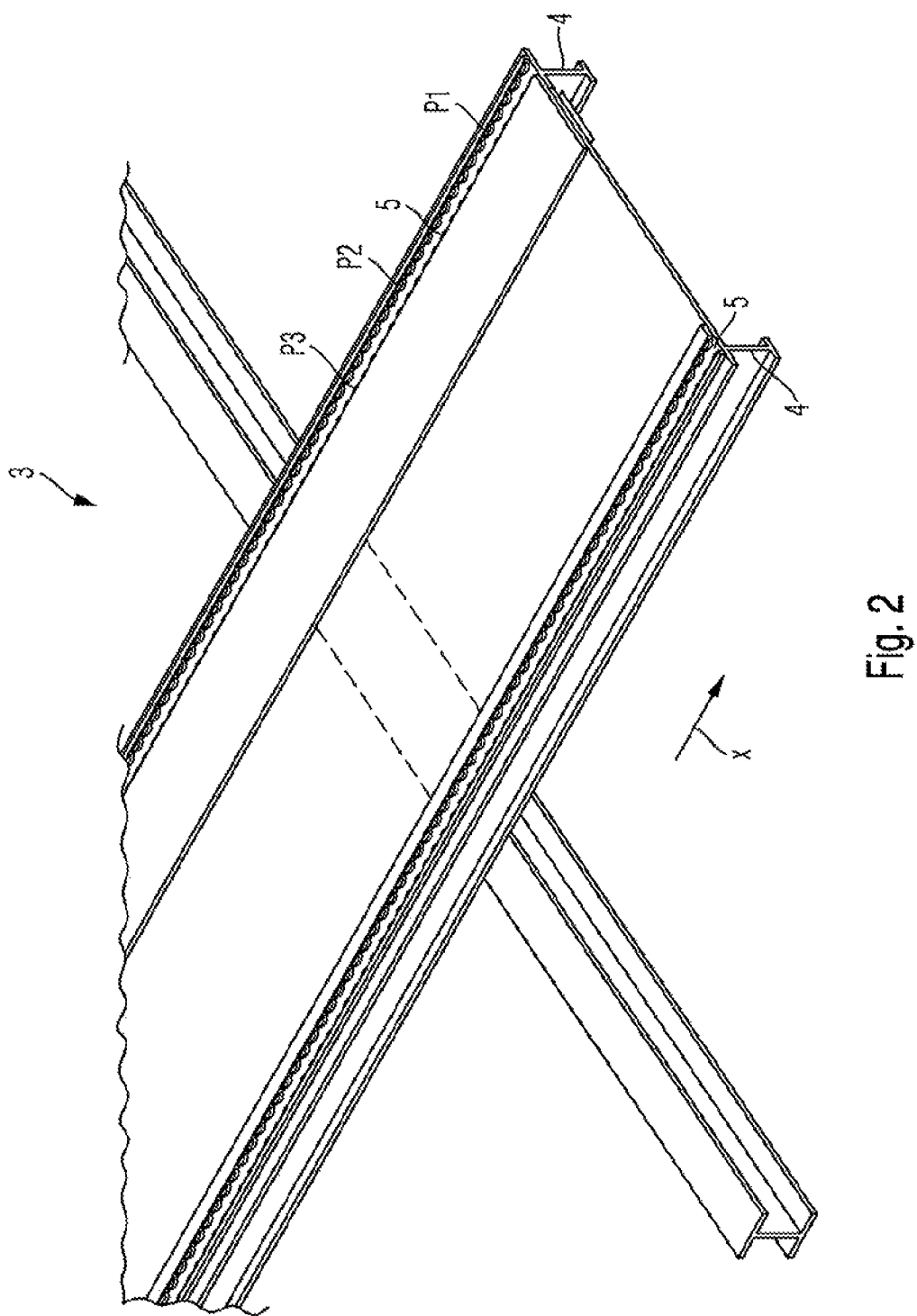
FIG. 2 is a perspective view of a rail system from FIG. 1.

As can be seen from FIG. 2, the rail system 3 comprises for example two rails 4. The rails 4 are each provided with a grid 5 for cooperating with locking means (not shown in greater detail) of seats 6 of the aircraft 2, only one seat 6 being shown by way of example in FIG. 1. The grids 5 together with the locking means of the seats 6 make it possible to position said seats flexibly along the longitudinal axis X.

The seats 6 comprise secondary windings S1-SM. For example, secondary windings S1, S2 and S3 can be assigned to a seat 6. For simplicity, however, only one secondary winding S1 is assigned to the seat 6 in the present embodiment. The seat 6 is rigidly connected to the secondary winding S1. That is to say, when the seat 6 is moved along the grid 5 for repositioning thereof, the secondary winding S1 moves therewith.

The seat 6 further comprises a data input and output device in the form of a touchscreen 7. The touchscreen 7 is connected to an in-flight entertainment system 8 of the aircraft 2. Films for example can thus be displayed and also searched for on the touchscreen 7, for example by pressing on the touchscreen 7.

The seat 6 further comprises a data input and output device in the form of a pax button 11. The pax button 11 is connected to a cabin management system 12.

The pax button 11 and the touchscreen 7 are further connected to an energy supply device 13. The touchscreen 7 and the pax button 11 represent electrical energy loads.

A plurality of passenger supply units 15, 15' are arranged above the seat 6, for example in a supply duct 14 of the aircraft 2. The passenger service units 15, 15' are connected to the cabin management system 12 so as to be controlled.

Each of the primary windings P1-PN is connected to a measuring means 16. The measuring means 16 is in turn connected to an evaluation means 17. The primary windings P1-PN are further connected to the energy supply device 13, which is set up so as to apply an alternating voltage thereto.

The measuring means 16 and the evaluation means 17 can together form a control unit 21, which is connected to the cabin management system 12. Alternatively, the evaluation unit 17 and/or the measuring means 16 can also be components of the cabin management system 12, for example.

Following on from the above substantially constructional description of the system 1 or aircraft 2, in the following the operation thereof will be explained in greater detail.

To measure a current position of the seat 6, the energy supply device 13 charges each of the primary windings P1-PN with a defined voltage. Because the secondary winding S1 overlaps in part with the primary windings P1 and P3 and the secondary winding S1 overlaps completely with the primary winding P2, the primary windings P1, P2 and P3 have a different impedance from the exposed primary windings, for example P4 and P5. This in turn leads to the current flow through the primary windings P1, P2 and P3 differing from that through the exposed primary windings, for example P4 and P5. The resulting currents I1, I2 and I3 for the respective primary windings P1, P2 and P3 are shown schematically in FIG. 3. The diagrams below the primary windings P1, P2 and P3 show the current strengths I through the primary windings P1, P2 and P3 for a position X of the secondary element S1 relative to the respective primary windings P1, P2 and P3.

Figure 3:
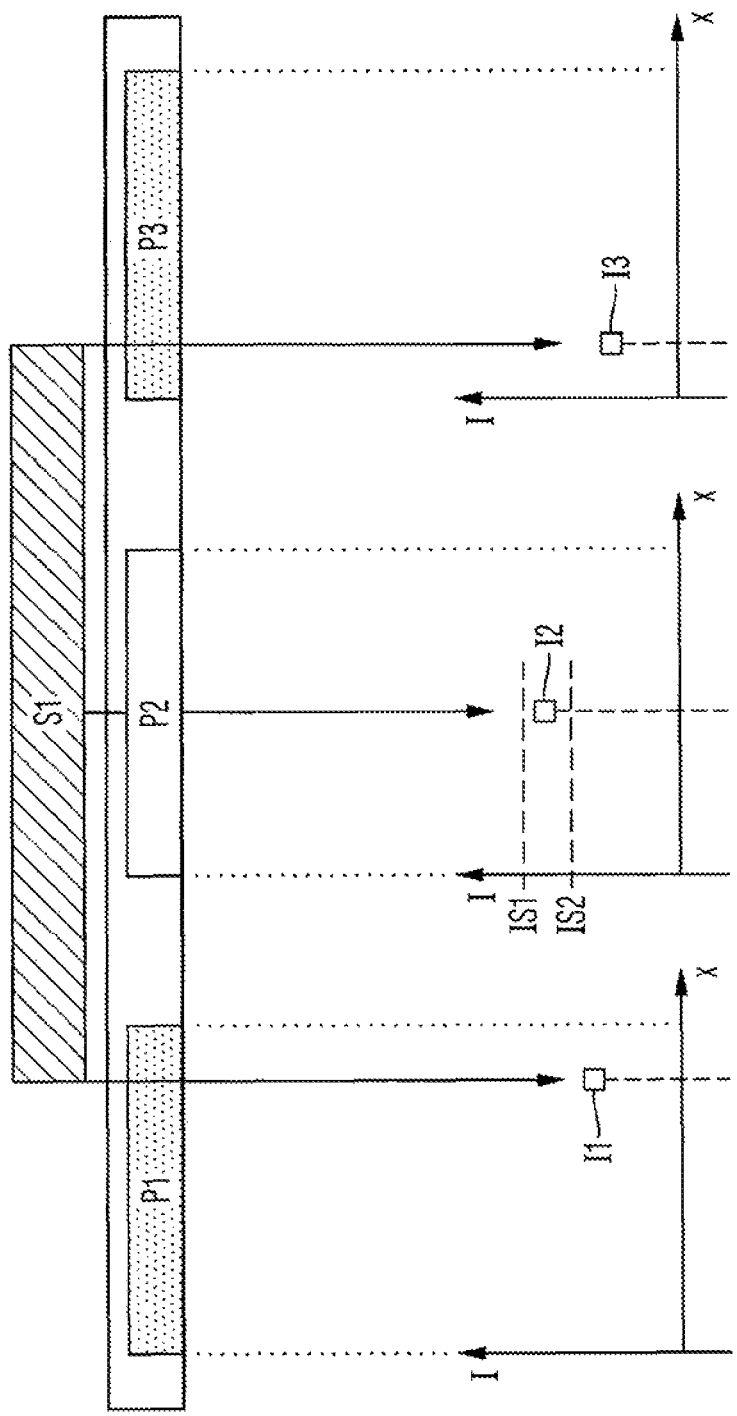
FIG. 3 shows different measurement values for the primary windings P1, P2 and P3 from FIG. 1.

The measuring means 16 measures the resulting currents I1 to IN. By means of the currents I1 to IN, the evaluation means 17 determines the position X of the secondary windings S1 and thus of the seat 6 relative to the primary windings P1-PN and thus relative to the rail system 3. In particular, the evaluation means 17 should be set up so as to recognise that when the current is between a first threshold IS1 and a second threshold IS2, there is a complete overlap between a secondary winding S1-SM and a primary winding P1-PN, as is illustrated by way of example for the primary winding P2 in FIG. 3. Further, the evaluation means 17 should be set up so as to establish, as a function of the resulting current I, to what extent a primary winding overlaps with a secondary winding, as is shown in FIG. 3 for the primary windings P1 and P3. By means of the currents I1, I2 and I3, the evaluation means 17 accordingly determines the exact position of the seat 6 along the longitudinal axis X relative to the rail system 3.

The evaluation means 17 preferably passes the current position of the seats 6 on to the cabin management system 12, which subsequently activates the passenger service units 15 which are assigned to the current position of a respective seat 6. In the present embodiment, this is the passenger service unit 15', since this is easiest to access for a passenger sitting on the seat 6. Once a passenger service unit 15' has been activated, it can be operated by the passenger; for example, after the activation, reading lamps thereof can be switched on and off. Further, the seat number of the seat 6, which is determined by the cabin management system 12 on the basis of the current positions of all of the seats 6 in the cabin, can be displayed on a screen (not shown) of the passenger service unit 15'.

The current position of the seat 6 is determined, as described above, in a first mode of the system 1.

In a second mode of the system 2, the energy supply device 13 supplies energy for operating the touchscreen 7 and the pax button 11 by means of the primary windings P1, P2 and P3 and the secondary winding S1. In this case, an energy management means 18 connected to the energy supply device 13 is set up so as to control the energy supply device 13 in such a way that it only provides energy to the primary windings P1, P2 and P3, and not to the exposed, that is to say non-overlapped, primary windings, for example the primary windings P4 and P5. For this purpose, the energy management unit 18 may be in a data connection with the measuring means 16 and/or the evaluation means 17.

Preferably, however, the energy from the energy supply device 13 is only provided to the primary winding P2, since this winding overlaps completely with the secondary winding S1, and highly efficient energy transfer can therefore be provided. The energy management means 18 is set up so as to control the energy supply device 13 accordingly.

In the second mode or in a third mode of the system 1, entertainment data from the in-flight entertainment system 8 may be supplied to the touchscreen 7 by means of the primary windings P1, P2 and P3 and the secondary winding S1. The in-flight entertainment system 8 can be connected to a data management means 19, which is set up so as to control the in-flight entertainment system 8 in such a way that data are only provided to the primary windings P1, P2 and P3, and not to the exposed primary windings, for example the primary windings P4 and P5.

In the second, the third or a fourth mode of the system 1, the cabin management system 12 can exchange data with the pax button 11 by means of the primary windings P1, P2 and P3 and the secondary winding S1. The cabin management system 12 can be connected to a data management means 20, which is set up so as to control the cabin management system 12 in such a way that data are only provided to the primary windings P1, P2 and P3, and not to the exposed primary windings, for example the primary windings P4 and P5.

The data management means 19 and 20 are connected to the measuring means 16 and/or the evaluation means 17, in a manner corresponding to the energy management means 18.

In the present context, the cabin management system 12 and the in-flight entertainment system 8 represent specific embodiments of a computer means.

A comparison means 22 of the system 1, which means may be a component of the cabin management system 12, is set up, for example in a fifth mode of the system 1, to compare the current position of the seat 6 with a target position thereof and to output an error message if the current position is different from the target position. Within the cabin management system 12, the comparison means 22 may be connected to a screen 23 for displaying the error message. The cabin management system 12 may further comprise a memory 24, in which the target positions of the seats 6, with which the comparison means 22 compares the current positions of the seats 6, are stored.

Although the present invention has been described in the above with reference to preferred embodiments, it is not limited thereto but can be modified in a variety of ways. In particular, "a" or "one" does not exclude a plurality. Further, the developments and embodiments described above for the system according to the invention or the aircraft or spacecraft according to the invention are applicable analogously to the method according to the invention, and vice versa.

Of course, the measuring means 16 can also work the other way around: it can also measure a resulting voltage. In this case, the energy supply device 13 supplies the primary windings P1-PN with a predetermined current.

In the following, preferred embodiments are explained:
Embodiment 1: A System
1 system
2 aircraft
3 rail system
4 rail
5 grid
6 seat
7 touchscreen
8 in-flight entertainment system
11 pax button
12 cabin management system
13 energy supply device
14 supply duct
15 passenger service unit
15' passenger service unit
16 measuring means
17 evaluation means
18 energy management means
19 data management means
20 data management means
21 control unit
22 comparison means
23 screen
24 memory
I current
X longitudinal direction
IS1 threshold
IS2 threshold
P1-PN primary windings
S1-SM secondary windings
I1-IN current

The invention claimed is:

1. An aircraft or spacecraft, comprising:
a cabin management system;
passenger-related means; and
a system, comprising:
a first vehicle part, which comprises one or more primary windings;
a second vehicle part, which comprises one or more secondary windings for a magnetic interaction with the one or more primary windings and can be arranged in various positions relative to the first vehicle part;
an energy supply device, which is set up to charge the one or more primary windings with a voltage or current in a first mode of the system;
a measuring means, which is set up so as to measure a resulting current flowing through the one or more primary windings or a resulting voltage at the one or more primary windings; and
an evaluation means, which determines a current position of the second vehicle part relative to the first vehicle part as a function of the resulting current or voltage;
the evaluation means supplying the current position of the second vehicle part to the cabin management system, and the cabin management system activating the passenger-related devices which are assigned to the current position of the second vehicle part.

2. An aircraft or spacecraft according to claim 1, wherein the computer means is formed as at least one of a cabin management system and an in-flight entertainment system of the aircraft or spacecraft.

3. An aircraft or spacecraft according to claim 1, wherein the passenger-related devices are formed as passenger service units.

4. An aircraft or spacecraft according to claim 1, wherein the comparison means is a component of a cabin management system of the aircraft or spacecraft.

5. An aircraft or spacecraft according to claim 1, wherein the first vehicle part is formed as a seat and the second vehicle part is formed as a seat rail of the aircraft or spacecraft.

6. A method for measuring a current position of a second vehicle part relative to a first vehicle part, for an aircraft or spacecraft, comprising the steps:
arranging the second vehicle part, which comprises one or more secondary windings, adjacent to the first vehicle part, which comprises one or more primary windings, in such a way that at least one secondary winding magnetically interacts with at least one primary winding;
charging the one or more primary windings with a voltage or current;
measuring a resulting current flowing through the one or more primary windings or a resulting voltage at the one or more primary windings;
determining the current position of the second vehicle part relative to the first vehicle part as a function of the resulting current or voltage;
supplying the current position of the second vehicle part to a cabin management system of the aircraft or spacecraft by means of the evaluation means, and passenger-related devices of the aircraft or spacecraft which are assigned to the current position of the second vehicle part being activated by means of the cabin management system.

7. A method according to claim 6,
characterised in that
energy and/or data are transmitted to a load or a data input and/or data output device of the second vehicle part by means of the one or more primary and secondary windings.

* * * * *